United States Patent Office 3,379,134
Patented Apr. 23, 1968

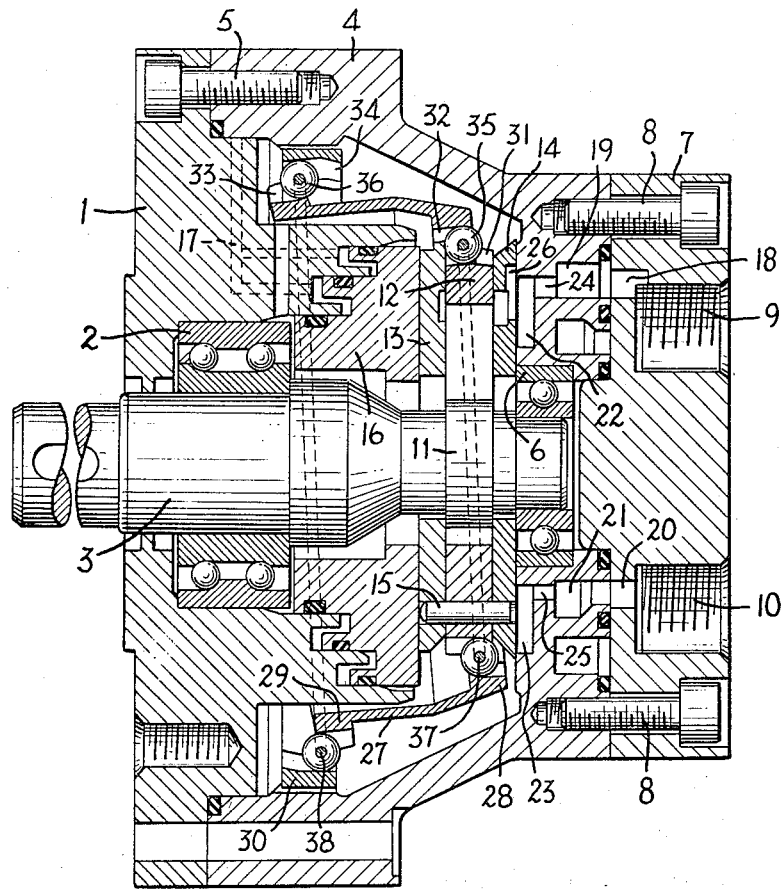

3,379,134
GUIDE MEANS AND ROTARY DEVICE
Jorgen Frederik Waldorff, Nordborg, Denmark, assignor to Danfoss A/S, Nordborg, Denmark, a company of Denmark
Filed July 12, 1966, Ser. No. 564,680
Claims priority, application Germany, July 13, 1965, D 47,720
8 Claims. (Cl. 103—130)

ABSTRACT OF THE DISCLOSURE

A rotary apparatus operative either as a gear pump or a gear motor having an inner gear traveling inside an outer ring gear in an eccentrically situated path or orbit and jointly defining therewith concavities with the teeth that alternately received fluid and then expel it from the concavities. The outer ring gear has rotary motion in an eccentric orbit applied thereto. A hollow shaft guides the outer gear in its orbital path and has passages within which rolling balls allow a rocking motion of the guide permitting eccentric orbital motion of the outer gear.

---

This invention relates to guide means particularly adapted for guiding a working element of a rotary device. In another aspect, this invention relates to a rotary device including such guide means.

The expression "working element of a device" is intended to refer to an element of a device which performs the function of the device. Thus, for example, in a gear pump the gears would be working elements of the device, i.e., of the gear pump. A device the working element or elements of which rotates or has a rotational moment imparted thereto may be referred to as a "rotary device."

In the prior art, a working element of a rotary device is guided by providing a set of teeth at the periphery of the working element and an annular casing having a like number of teeth which engage the teeth of the working element. However, this arrangement has a number of serious disadvantages. For one thing, there is a substantial loss of energy due to friction. Also, the fabrication of the two sets of teeth requires great care and is expensive. According to another prior art arrangement, the working element is mounted on two tool blocks which are vertically displaceable with respect to each other; this has the disadvantage of being complicated.

In my copending application Ser. No. 540,443, filed Mar. 7, 1966, there is disclosed guide means essentially constituting arcuate recesses in the periphery of the working element and rollers rotatably mounted on fixed axes to engage the arcuate recesses. The rollers are each in the configuration of a cylinder having a diameter smaller than the diameter of the recesses. In a preferred embodiment, the "working element" is a spur internal gear. The spur internal gear is driven by a spur external gear mounted on a drive shaft. The drive shaft is a conventional cardan shaft having a gear-like cross section which engages a toothed bore through the spur external gear.

While the device of the copending application represents a substantial improvement over the prior art, the present device has certain advantages with respect to the device of the copending application. Thus, in the device of the copending application, at any given instant, only some of the rollers are in engagement with the recesses; accordingly, the force of the rotational moment is borne by only some of the rollers whereby the maximum rotational moment which can be applied is limited. Furthermore, the cardan shaft is of relatively small diameter, thus resulting in the application of a relatively great force by each tooth of the cardan shaft to each tooth of the bore through the spur external gear when the rotational moment is applied. This limits the maximum rotational moment which can be applied.

According to the present invention, in a rotary device generally like that of the copending application there is provided a novel hollow shaft which eliminates the need for a drive shaft of the conventional cardan type by performing the function of the latter in permitting axial displacement of the elements in the casing of the rotary device and which also functions as a guide means and therefore takes the place of the rollers and recesses of the copending application.

The guide means of the present invention guides the working element of the rotary device so that the center of the working element describes a closed loop when the rotational moment is imparted to the working element. The guide means according to the invention comprises slots in the periphery of the working element and complementary slots in the hollow shaft; thus, the hollow shaft constitutes means defining slots complementary to the slots in the periphery of the working element. The slots have a cross section in the configuration of a segment of a circle; thus, the cross section of passages defined by the complementary pairs of slots is circular. The slots in the periphery of the working element extend across the periphery in a direction generally parallel to the axis of the rotational moment and have a longitudinal axis in the configuration of an arc, the arc lying in a plane normal to the plane of the rotational moment and intersecting the center of the working element. Accordingly, the passages of circular cross section defined by the complementary pairs of slots have arcuate longitudinal axes. The guide means of the present invention further comprises balls each respectively mounted in and engaging the walls of a respective one of the arcuate passages. Accordingly, when the rotational moment is imparted to the working element, the hollow shaft is permitted to rock due to a rolling of the balls in the arcuate passages. Coincident with the rocking of the hollow shaft the center of the working element moves in a path defining a closed loop. All the balls are always in complete engagement with the walls of all the arcuate passages. Therefore, the force of the rotational moment is equally distributed to the walls of all the arcuate passages whereby the maximum rotational moment which can be applied to the working element is greater than when other guiding means are employed.

The rotary device incorporating the guide means of the invention is generally similar to the rotary device described in the copending application except for the provision of the guide means of the invention including the hollow shaft.

The rotary device includes a casing enclosing an annular element, and an inner element disposed internally of the annular element. The annular element has an inner surface having alternating convexities and concavities. Similarly, the inner element has an outer surface having alternating convexities and concavities. For each of the elements, since the concavities and convexities alternate, the number of concavities is equal to the number of convexities. However, for the sake of convenience and simplicity of expression hereinafter in the specification and in the claims, sometimes only the concavities or only the convexities will be referred to. The number of the convexities of the annular element exceeds, by at least one, the number of the convexities of the inner element. Specific embodiments of the rotary device of the invention include gear pumps, gear engines, and steering devices. Using gear terminology, one skilled in the art may refer to the annular element as a "spur internal gear," in view of the internally disposed alternating concavities and convexities, and to the inner element as "spur external gear," in view of the externally disposed alternating concavities and convexities.

The rotary device further includes a conventional shaft rotatably mounted in the casing. The shaft either mounts the inner element or is operatively connected to the annular element for rotation with the shaft. For each rotation of the conventional shaft, the hollow shaft is subjected to a number of cycles of rocking equal to the number of concavities or convexities of the annular element.

The concavities and convexities, respectively, of the inner element are engageable with the convexities and concavities, respectively, of the annular element. The distance between a substantially opposed concavity and convexity of the annular element is at least equal to the distance between substantially opposed concavities of the inner element. Accordingly, upon rotation of the shaft, at any given moment only some of the concavities and convexities, respectively, of the inner element are in engagement with only some of the convexities and concavities, respectively, of the annular element. The expression "substantially opposed" refers to the closest approximation to perfect opposition. Thus, the expression "a substantially opposed concavity and convexity of the annular element" refers to any concavity and convexity of the annular element which come at least as close to perfect opposition as any other concavity and convexity of the annular element. The expression "substantially opposed concavities of the inner element" is defined in like manner. The engagement of the inner element with the annular element motivates in a closed loop the element which is not mounted on or operatively connected to the shaft for rotation therewith.

An inlet conduit and an outlet conduit, for fluid, defined through the casing are provided. Because of the above-described configurations of the annular and inner element, spaces exist between the concavities and convexities thereof. These spaces serve as fluid chambers. A first plate is mounted for rotation of its center about the axis of the shaft. This plate is disposed in such a manner that a face thereof constitutes a common wall of the chambers. A conduit or passage is provided through the plate to communicate with one of the chambers. A second plate is fixedly mounted in the casing and disposed so that a face thereof contacts the face of the first plate which is opposed to the face serving as a common wall of the chambers. A conduit or passage is provided through the second plate, which conduit or passage communicates with either the inlet conduit or the outlet conduit. The "second plate" may actually be the base wall of the casing and integral with side walls of the casing.

The respective conduits of the first and second plates each have an opening at their respective contacting faces. Since the center of the first plate follows a path in the configuration of a closed loop about the axis of the shaft, the opening on its face also follows such a path. The opening on the face of the second plate is so disposed that this closed loop path intersects it. During the intersecting of the two openings they are in at least partial registry and, thereby, communication is established between the chamber and the inlet or outlet conduit.

It should be appreciated that in referring herein to a conduit communicating with a chamber, it is intended to denote a dynamic rather than a static situation. In other words, when the shaft is rotating the chamber in question will continuously and cyclically be expanding and contracting due to the respective configurations and motions of the inner and annular elements. Due to this action, a fluid leaving the device is at a significantly different pressure than when it was introduced into the device. Thus, for example, when the shaft is driven by an external power source such as an electric motor, the device is a form of gear pump.

Generally, a conduit system as hereinabove described is provided for each of the chambers. Furthermore, generally, each of the chambers is provided with two conduit systems as hereinabove described, one of the conduit systems communicating with the inlet conduit and the other with the outlet conduit. Also, two common conduits or headers are provided. One of these common conduits serves as a common link between each of the conduits of the second plate intended ultimately to communicate with the inlet conduit and the outlet conduit, and the other common conduit serves similarly with respect to the conduits of the second plate intended ultimately to communicate with the outlet conduit.

When the second plate is provided with a second conduit in order that means for communicating with both the inlet and the outlet conduit exist, the opening of the second conduit on the face of the second plate contacting a face of the first plate is disposed in the closed loop path followed by the opening of the first plate. However, the two openings on the second plate are sufficiently spaced apart so that only one at a time is in at least partial registry with the opening on the first plate. Therefore, alternatingly, communication is established between the chamber and the inlet conduit or the outlet conduit and, accordingly, fluid is permitted into the chamber and then is permitted to leave the chamber. Thus, the arrangement described serves as distribution valve means.

Since a fluid is communicating with the chambers at only one side of the elements in the arrangement above described, that side being namely the side at which the plates are disposed, an unbalanced pressure is exerted on the elements. Accordingly, for smooth, efficient operation, the need sometimes arises to counteract or balance this unbalanced pressure. Accordingly, there is provided a conduit communicating between one of the common conduits and pressure exerting means displaceably mounted in a wall of the casing opposite the face of the second plate having the opening or openings and at a side of the elements opposite the side thereof at which the plates are disposed. The pressure exerting means is displaceable toward the elements under the influence of fluid pressure transmitted through the conduit communicating between the common conduit and the pressure exerting means. Thereby, a fluid pressure is exerted against the elements in a direction to counteract the fluid pressure on the elements at the opposite side thereof. Generally, one of these arrangements is provided with respect to each of the common conduits.

In a preferred arrangement, a third plate is provided. This plate is mounted at the side of the elements opposite the side thereof at which the first and second plates are disposed, whereby the third plate constitutes a second common wall of the chambers.

It is preferred that the above referred to openings on the plates each be in the form of a radial slot. When the second plate is provided with a pair of conduits for each chamber, generally the two radial slots on the second plate will be separated by a circumferential distance at least equal to the width of the radial slot of the first plate.

According to another feature of the present invention, there is provided a hollow shaft interconnecting one of the elements either with the casing or with the aforementioned conventional shaft. Herein the conventional shaft is referred to simply as "the shaft" to differentiate it from the hollow shaft. In a preferred embodiment, one end of the hollow shaft is turned inwardly and is disposed circumferentially about the annular element. The inwardly turned end of the hollow shaft and the periphery of the annular element have complementary arcuate slots which define arcuate passages as referred to above. A ball is disposed in each of these passages engaging the walls thereof. Preferably the balls are rotatably mounted on a member encircling the annular element. The other end of the hollow shaft is turned outwardly and has arcuate slots like those in the inwardly turned end of the hollow shaft. Circumferentially about the outwardly turned end of the hollow shaft are disposed slots complementary to the slots in the outwardly turned end of the hollow shaft to define a second set of arcuate passages. These complementary slots are either defined directly in internal faces of the side walls of the casing or in an annular member mounted on these internal faces. For this second set of arcuate passages there is provided a second set of balls engaging the walls thereof and, similarly, there is preferably provided a member encircling the outwardly turned end of the hollow shaft and on which the second set of balls are rotatably mounted.

A specific embodiment of the invention will now be described by reference to the accompanying drawing of a longitudinal section of a gear pump according to the invention.

The casing of the gear pump comprises a front wall member 1 in which is mounted, by means of a ball bearing 2, a shaft 3. The casing further comprises a cover constituting side walls of the casing integral with a base wall of the casing. Screws 5 fasten front wall member 1 to cover 4. A lid 7 fastened to the base of the cover 4 by means of screws 8 completes the casing. An outlet conduit 9 and an inlet conduit 10 are provided through the lid 7.

On the shaft 3 an inner element 11 is mounted for rotation with the shaft 3. The inner element 11 has alternating concavities and convexities or teeth on its outer peripheral surface. The teeth of the inner element 11 are in engaging relationship with alternating concavities and convexities or teeth on the inner peripheral surface of an annular element 12. Two plates 13 and 14 are fixedly mounted on the opposed faces of the annular element 12 by means of bolts 15. Spaces or chambers exist between the concavities and convexities or teeth of the elements 11 and 12.

Axially slideably mounted in the casing in facing relationship to the plate 13 is a plunger 16. In the front wall member 1 of the casing there is provided a conduit 17 having branches which communicate with annular recesses provided in the front wall member 1. The plunger 16 is provided with the annular ridges which mate with the annular recesses. Each of the annular ridges is provided with a circumferential notch in which is disposed a gasket. The conduit 17 communicates with the other side of the assembly of inner element 11, annular element 12, and plates 13 and 14 by means of conduits in the cover 4 (not shown) in an arrangement corresponding to that illustrated in the copending application. Accordingly, the plunger 16 is urged against the plate 13 and counteracts the fluid pressure at the other side of the aforementioned assembly.

Outlet conduit 9 is in communication with an annular slot or common conduit 19 in the base plate of the cover 4 through a bore 18 in the lid 7. Similarly, inlet conduit 10 is in communication with an annular slot or common conduit 21 in the base plate of the cover 4 through a bore 20 in the lid 7.

On the face of the base plate of the cover 4 facing the plate 14 are provided radial slots 22, 23 arranged in pairs, the number of pairs of these slots being equal to double the number of convexities of the annular element 12. The radial slots 22, 23 are in communication through bores 24 and 25, respectively, with the common conduits 19 and 20, respectively.

In the face of the plate 14 facing the base plate of the cover 4 are provided radial slots 26. The number of radial slots 26 is equal to the number of convexities of the annular element 12. The spaces between the concavities and convexities of the inner element 11 and the annular element 12 constitute chambers. Each of the radial slots 26 communicates with a respective one of these chambers through a bore in the plate 14. This arrangement of paired radial slots and single radial slots is like that of the copending application.

A hollow shaft 27 is provided to comprise guide means for the annular element 12. The hollow shaft 27 has an inwardly turned end 28 circumferentially disposed about the annular element 12 and an outwardly turned end 29 juxtaposed to an annular member 30 fixed on internal faces of the cover 4. The annular element 12 is provided with a plurality of circumferentially spaced slots 31 in its periphery. The slots 31 each have a cross section in the configuration of a segment of a circle. The longitudinal axis of each of the slots 31 defines an arc lying in a plane normal to the plane in which the inner element 11 rotates and intersecting the center of the inner element 11. A complementary set of slots 32 is provided in the inwardly turned end 28 of the hollow shaft 27, each slot 32 having the same axis as each corresponding slot 31 and having a cross section in the configuration of a segment of a circle which complements the cross section of each corresponding slot 31 to define therewith arcuate passages of circular cross section. In the same menner, a like set of passages is defined by slots 33 in the outwardly turned end of the shaft 7 and complementary slots 34 in the annular member 30.

Balls 35 are each respectively mounted in a respective one of the first mentioned set of arcuate passages engaging the walls thereof so that each of the arcuate passages is provided with a ball 35. In like manner, each of the last mentioned arcuate passages is provided with a ball 36. The balls 35 are rotatably mounted on a wire ring 37, and the balls 36 are rotatably mounted on a wire ring 38.

When the shaft 3 is driven, thus rotating the inner element 11, a rotational moment is imparted thereby to the annular element 12. The rotational moment causes the annular element 12 to rotate eccentrically, i.e., the center of the annular element 12 moves in a path defining a closed loop. The hollow shaft 27 permits this reaction to the rotational moment by the annular element 12 by rocking, a rolling of the balls 35 and 36 in the arcuate slots facilitating this rocking.

Thus, when the rotational moment is applied, each of the radial slots 26 follows a closed loop path. For each revolution of the inner element 11, this closed loop path is repeated a number of times equal to the number of concavities or convexities of the annular element 12. As in the arrangement of radial slots in the copending application, radial slots 26 are so disposed in relation to radial slots 22, 23 that each radial slot 26 comes into at least partial registry alternatingly with one of the corresponding pair of radial slots 22, 23. Only one of the pair of radial slots 22, 23 at a time is in at least partial registry with the corresponding radial slot 26 because the radial slots 22, 23 of each pair are circumferentially spaced upon from one another by a distance at least equal to the width of the corresponding radial slot 26. Accordingly, communication is alternatingly established between the chambers defined by the concavities and convexities of the annular and inner elements and the inlet and outlet conduits 10 and 9.

Viewing the device from the end at which the shaft 3 protrudes, when the shaft 3 is rotated counterclockwise, the device operates as a pump, sucking quantities of a fluid, preferably liquid, through the inlet conduit 10 and discharging the fluid through the outlet conduit 9. On the other hand, when it is desired to use the device as a gear motor, the shaft 3 is not connected to a driving means, a fluid, preferably a liquid, under pressure is supplied to the inlet conduit 10 and the fluid imparts a moment of rotation to the shaft 3 and the shaft 3 rotates in the aforementioned direction; the fluid discharges through the outlet conduit 9. By reversing the direction of flow through the device by making the outlet conduit the inlet conduit and vice versa, the direction of rotation of the shaft is reversed.

The invention is not to be construed as limited to the particular forms disclosed herein, since these are to be regarded as illustrative rather than restrictive. Thus, for example, the slots 34 may be provided directly in the internal faces of the cover 4. As another alternative, the outwardly turned end 29 of the hollow shaft 27 may be instead inwardly turned and operatively connected to the shaft 3 by an arrangement of slots and balls like that at the other end. It will be appreciated that a major advantage of the present invention is that each of the arcuate passages provided by the arcuate slots is always in engagement with a ball so that there is an extremely large area of power transmission.

What I claim and desire to secure by Letters Patent is:

1. A device comprising a working element, means to impart a rotational moment to said working element and guide means to guide said working element so that the center of said working element describes a closed loop when the rotational moment is imparted, said guide means comprising slots having a cross section in the configuration of a segment of a circle and extending across the periphery of said working element in a direction generally parallel to the axis of said rotational moment and having a longitudinal axis in the configuration of an arc, said arc lying in a plane normal to the plane of said rotational moment and intersecting the axis of said rotational moment, means defining second slots complementary to said first mentioned slots and thereby constituting with said first mentioned slots arcuate passages, and balls each respectively mounted in and engaging the walls of a respective one of said arcuate passages, whereby when said rotational moment is imparted to said working element said working element is permitted to rotate eccentrically due to a rocking of said means defining second slots and an accompanying rolling of said balls in said passages and the center of said working element moves in a path defining a closed loop.

2. A device according to claim 1, further comprising means interconnecting and defining a common axis of rotation for said balls, said axis of rotation being generally parallel to the periphery of said working element.

3. A device according to claim 2, in which said means interconnecting and defining a common axis of rotation for said balls comprises a member encircling said working element and on which said balls are rotatably mounted.

4. A rotary device for interacting with a fluid comprising a casing enclosing an annular element, an inner element disposed internally of said annular element, said annular element having an inner surface having alternating convexities and concavities and said inner element having an outer surface having alternating and convexities and concavities, the number of said convexities of said annular element exceeding the number of said convexities of said inner element, a shaft rotatably mounted in said casing and mounting one of said elements, the concavities and convexities, respectively, of said inner element being engageable with the convexities and concavities, respectively of said annular element and the distance between a substantially opposed concavity and convexity of said annular element being at least equal to the distance between substantially opposed concavities of said inner element whereby upon rotation of said shaft at any given moment only some of the concavities and convexities respectively of said inner element are in engagement with only some of the convexities and concavities, respectively, of said annular element and said engagement motivates the aforementioned one of said elements in a closed loop path of the center thereof, an inlet conduit and an outlet conduit defined through said casing, a first plate mounted for rotation of its center about the axis of said shaft and having a face constituting a common wall of chambers defined by spaces between said concavities and said convexities of said elements, a conduit defined through said first plate and communicating with one of said chambers and including an opening on the other face of said first plate, guide means to guide the element other than the element mounted on said shaft so that the center of said other element describes a closed loop, said guide means comprising slots in said other element, said slots each having a cross section in the configuration of a segment of a circle and extending across the periphery of said other element in a direction generally parallel to the axis of said rotational moment and having a longitudinal axis in the configuration of an arc, said arc lying in a plane normal to the plane of said rotational moment and intersecting the axis of said rotational moment, means defining second slots complementary to said first mentioned slots and thereby constituting with said first mentioned slots arcuate passages, and balls each respectively mounted in and engaging the walls of a respective one of said arcuate passages, a second plate fixedly mounted in said casing and having a face contacting said other face of said first plate, a conduit defined through said second plate and communicating with one of said conduits defined through said casing and including an opening on said face of said second plate, the opening on the first plate and the opening on the second plate being so disposed that upon rotation of said shaft said openings periodically come into and out of at least partial registry and thereby communication between said one of said chambers and said one of said conduits defined through said casing is established when said openings are in at least partial registry and terminated when said openings are out of said at least partial registry.

5. A rotary device according to claim 4, in which the one of said elements mounted by said shaft is said inner element and further including a hollow shaft having an inwardly turned end defining said second slots.

6. A rotary device according to claim 5, in which the other end of said hollow shaft is outwardly turned and defines slots like the slots defined by the inwardly turned end and in said casing are provided means defining slots complementary to the slots defined by the outwardly turned end and constituting with the slots defined by the outwardly turned end second arcuate passages, and second balls each respectively mounted in and engaging the walls of a respective one of said second arcuate passages.

7. A rotary device according to claim 6, further comprising means interconnecting and defining a common axis of rotation for said first mentioned balls and means interconnecting and defining a common axis of rotation for said second balls.

8. A rotary device according to claim 7, in which said means interconnecting and defining a common axis of rotation for said first balls comprises a member encircling said inner element and on which said first balls are rotatably mounted and said means interconnecting and defining a common axis of rotation for said second balls comprises a member encircling said outwardly turned end of said hollow shaft and on which said second balls are rotatably mounted.

References Cited

UNITED STATES PATENTS

| | | | |
|---|---|---|---|
| 1,946,358 | 2/1934 | Porsche et al. | 74—650 |
| 2,441,052 | 5/1948 | Wilmer | 64—9 |
| 2,968,936 | 1/1961 | Croset | 64—9 |
| 3,270,683 | 9/1966 | McDermott | 103—126 |

DONLEY J. STOCKING, *Primary Examiner.*

ROBERT M. WALKER, *Examiner.*

T. R. HAMPSHIRE, *Assistant Examiner.*